United States Patent [19]
Fujimoto et al.

[11] Patent Number: 5,221,509

[45] Date of Patent: Jun. 22, 1993

[54] METHOD AND APPARATUS FOR INJECTION AND COMPRESSION MOLDING

[75] Inventors: Satoshi Fujimoto; Makoto Nogawa; Hideaki Okubo, all of Hiratsuka, Japan

[73] Assignee: Kabushiki Kaisha Komatsu Seisakusho, Tokyo, Japan

[21] Appl. No.: 499,453

[22] PCT Filed: Oct. 26, 1989

[86] PCT No.: PCT/JP89/01104

§ 371 Date: Jan. 15, 1991

§ 102(e) Date: Jan. 15, 1991

[87] PCT Pub. No.: WO90/04508

PCT Pub. Date: May 3, 1990

[30] Foreign Application Priority Data

Oct. 27, 1988 [JP] Japan ............................ 63-272122
Oct. 31, 1988 [JP] Japan ............................ 63-275472

[51] Int. Cl.⁵ .................... B29C 45/70; B29C 43/34
[52] U.S. Cl. ................... 264/328.7; 264/328.8; 264/328.11; 264/328.13; 425/145; 425/150; 425/562; 425/574
[58] Field of Search ............ 264/40.1, 40.5, 328.7, 264/328.8, 328.9, 328.11, 328.13; 425/135, 145, 146, 147, 149, 150, 555, 562, 563, 564, 574, 589, 592, 593

[56] References Cited

U.S. PATENT DOCUMENTS

| | | | |
|---|---|---|---|
| 3,616,495 | 11/1971 | Lemelson | 425/152 |
| 4,828,769 | 5/1989 | Maus et al. | 264/328.7 |
| 4,889,478 | 12/1989 | Sato | 425/150 |
| 4,933,119 | 6/1990 | Weymouth, Jr. | 264/328.7 |
| 5,057,255 | 10/1991 | Sato et al. | 264/328.7 |
| 5,059,364 | 10/1991 | Okubo et al. | 264/328.7 |

FOREIGN PATENT DOCUMENTS

| | | |
|---|---|---|
| 0262229 | 4/1988 | European Pat. Off. |
| 55-6054 | 2/1980 | Japan |
| 59-185637 | 10/1984 | Japan |
| 60-179218 | 9/1985 | Japan ........... 425/589 |
| 61-22917 | 1/1986 | Japan |
| 61-83016 | 4/1986 | Japan |
| 63-9523 | 1/1988 | Japan |
| 89-09124 | 5/1989 | PCT Int'l Appl. |
| 89-09125 | 5/1989 | PCT Int'l Appl. |
| 2138737 | 10/1984 | United Kingdom |

Primary Examiner—Jill L. Heitbrink
Attorney, Agent, or Firm—Richards, Medlock & Andrews

[57] ABSTRACT

An injection and compression molding apparatus and a method include the steps of supplying molten resin by injecting it into a cavity formed by molds and compressing the resin by applying pressure. In consideration of problems with respect to the occurrence of sink marks in molded products and the deterioration in precision which are caused by the escape of resin during compression and a change in the cavity distance between two molds, an injection and compression molding apparatus and a molding method therefor are capable of resolving the problems and stably producing molded products with good productivity. A gate is closed during compression, and a supplemental amount of resin can be injected after the compression step so as to supply the desired amount of resin in the molded article. The rear side of a movable mold can be held by a mechanical fixing mechanism so that no change is produced in the distance between the molds owing to the pressure applied during injection, and resin is supplied by injection while the distance between the molds being maintained. It is thus possible to stably provide molded products with good appearance, dimensional precision and quality with good productivity.

15 Claims, 6 Drawing Sheets

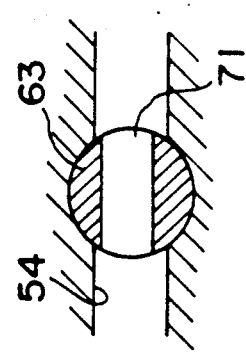
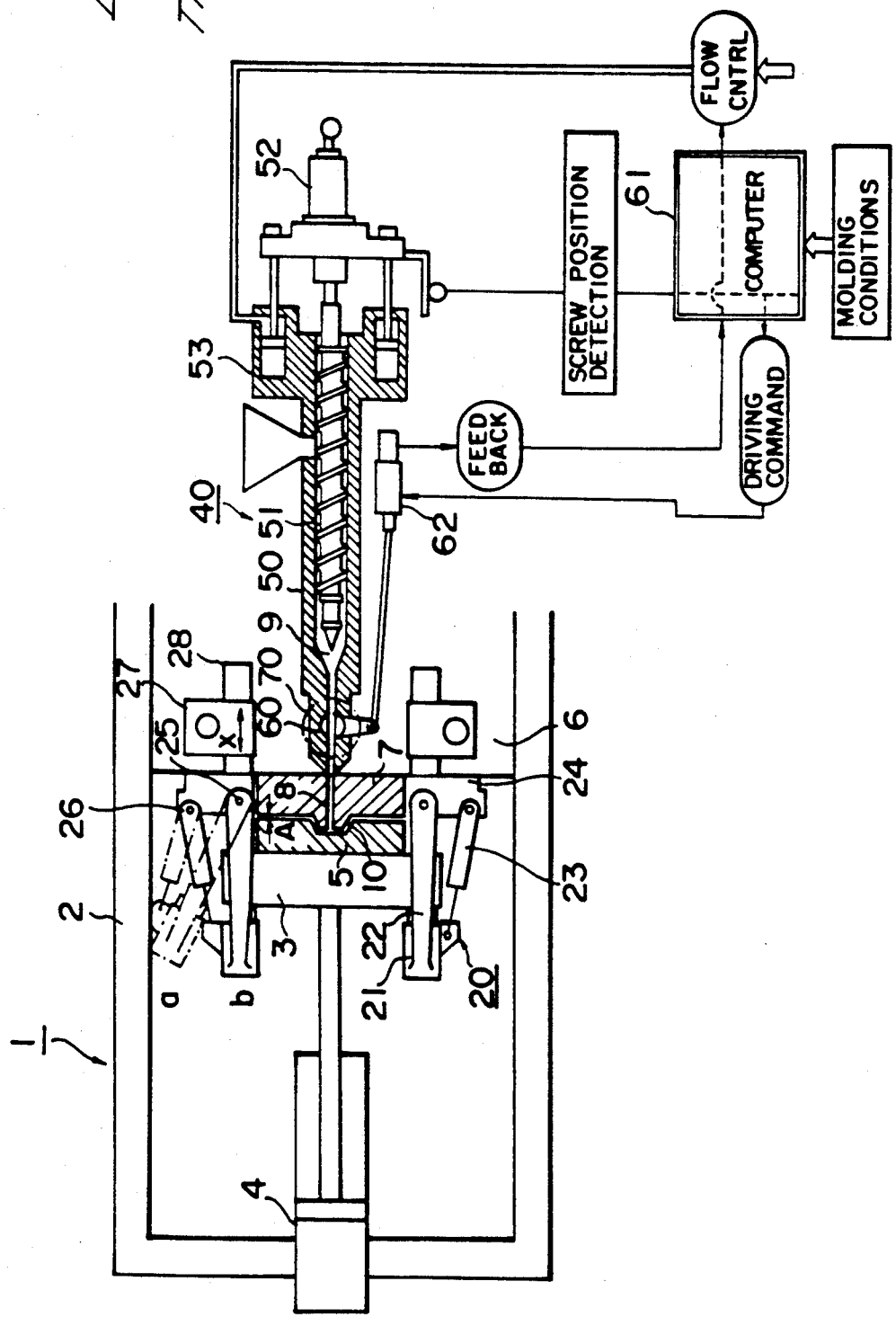
FIG. 1A
FIG. 1B

METHOD AND APPARATUS FOR INJECTION AND COMPRESSION MOLDING

BACKGROUND OF THE INVENTION

1. Field of the Invention

The present invention relates to an injection and compression molding apparatus for plastics and a molding method therefor. In one aspect the invention relates to an injection and compression molding apparatus for plastics and a molding method therefor in which the feed of molten resin into molds, a pressure apparatus and a molding method therefor are improved.

2. Description of Related Art

In conventional injection molding operations, since molten resin is supplied into a closed mold cavity through a gate, orientation occurs in the resin, and strong residual strain remains in a portion adjacent to the gate owing to the high pressure at the gate. Curvature and twisting therefore occur in molded products, and physical properties in a portion near the gate deteriorate. A method of resolving this problem is an injection and compression (or press) molding method in which molten resin is supplied by injection into molds which are appropriately opened and which are then closed to effect compression molding. In this method, however, if the molten resin flows backward through the gate during clamping compression, sinking (sink mark) occurs in a portion of the molded article near the gate, and the weight of the resin in the molded article is reduced, resulting in the deterioration in the stability of the properties of the resulting molded products. In order to resolve this problem during clamping compression, several methods have been proposed, e.g., a first method of effecting compression after the gate has been closed (after the resin at the gate has solidified), a second method of closing a supply port (Japanese Patent Laid-Open No. 61-22917), a third method of controlling compression pressure (Japanese Patent Laid-Open No. 61-83016) and so on.

In injection and compression molding by the first method, however, compression must be effected after the gate has been closed (the resin at the gate is solidified), and thus compression cannot be properly timed easily. In addition, if the gate size is reduced in order to speed up the sealing of the gate, injection of the resin requires more time, and products having appropriate sizes are not obtained in some cases. In the case of the second method in which the supply port is closed, if compression is performed early, the resin flows backwardly, and the closing of the supply port and compression cannot be easily timed because the supply port cannot be easily, completely and rapidly closed. In the third method of controlling compression pressure, since there are many conditional limitations for preventing any counter flow, it is difficult to set conditions. The second method and third method also involve the problem that the presence of a sprue runner makes the methods difficult.

In the second method, mold clamping is stopped or the speed of molding clamping is reduced during the operation of supplying molten resin into the cavity, Mold clamping is again started or the speed of mold clamping is increased at the same time as or immediately before the molten resin is completely supplied, and press molding is then performed. However, the second method involves the problem that if a movable platen is precisely stopped or the speed of movement thereof is reduced during the course of movement, the movable platen is moved backwardly or inclined by the reaction force of the molten resin supplied into the cavity of the molds, resulting in a change in a compression margin and the formation of defective molded products. The second method also involves the following problems. Since the movement of the movable platen is unstable, i.e., the movable platen can be moved backwardly, or compression is not effected in a parallel state, molded products cannot be stably obtained. Since molten resin is supplied to the molds which are appropriately opened, and the molds are then clamped for compression molding, if the closing of the supply port and compression are not well timed when the supply port is closed, the molten resin can flow backwardly through the gate during clamping compression. Hence, sinking occurs in a portion of the molded article near the gate or the weight of the resin in the molded article is reduced, and thus molded products cannot be stably obtained.

In consideration of the aforementioned problems, it is an object of the present invention to provide an injection and compression molding apparatus and a molding method therefor which are capable of stably producing molded products having good appearance and dimensional precision and high quality with good productivity and having no sink mark in the portion near the resin supply port.

SUMMARY OF THE INVENTION

In one aspect of the present invention, an injection and compression molding apparatus comprises a stationary mold, a movable mold which is moved by a hydraulic means so as to approach or separate from the stationary mold, an injection mechanism for injecting molten resin into a cavity formed by the two molds, and a gate opening/closing means which is provided in the injection passage extending from the injection mechanism to the cavity.

In a second aspect of the present invention, an injection and compression molding apparatus comprises a stationary mold, a movable mold which is moved by a hydraulic means so as to approach or separate from the stationary mold, an injection mechanism for injecting molten resin into a cavity formed by the two molds, and a mechanical fixing mechanism which mechanically supports the rear side of the movable mold for the purpose of restricting the backward movement of the movable mold caused by injection pressure.

In a third aspect of the invention, an injection and compression molding apparatus comprises a stationary mold, a movable mold which is moved by a hydraulic means so as to approach or separate from the stationary mold, an injection mechanism for injecting molten resin into a cavity formed by the two molds, a gate opening/closing means provided in the injection passage extending from the injection mechanism to the cavity, and a mechanical fixing mechanism which mechanically supports the rear side of the movable mold for the purpose of restricting the backward movement of the movable mold caused by injection pressure. In this case, the gate opening/closing means is a variable valve capable of changing the effective sectional area of the passage when the valve is opened.

In addition to the above-described arrangements, mold opening can be detected by a mold opening detecting means so that mechanical restriction can be performed at the starting point of compression, or a means for detecting an injection capacity can be provided so that a suitable starting time of compression can be obtained.

A method for injection and compression molding in accordance with the present invention comprises supplying molten resin by injecting it into a cavity formed by molds, compressing, cooling and then molding the resin, in which a movable mold is temporarily stopped for the purpose of supplying resin by injection at a starting point of compression in the stroke of the movable mold, and the gate passage of an injection mechanism is closed during the compression stroke.

The gate passage is opened after the compression step so that a supplemental amount of the resin can be supplied by injection. In this case, the effective cross sectional area of the gate passage during the second injection may be smaller than the effective cross sectional area during the initial injection. The position where the movement of the movable mold is restricted is detected by mold position sensors so that the movable mold is stopped, and the position where compression is started is detected by an injection amount detecting means so that compression is started.

In the aforementioned embodiment, the gate valve is opened by the gate opening/closing mechanism at the position where the molds are open a predetermined amount so that the resin is injected therein, and the gate is then closed after injection has been completed. Although the resin is compressed at the time or before the time injection is completed, since the gate is closed by the gate opening/closing mechanism until compression is completed, only a small amount of resin escapes owing to the backward flow, and molding can be thus effected with the occurrence of a backward flow only in a portion of the cavity very close to the injection port connected to the gate. In addition, since the rear side of the movable mold is supported by the mechanical fixing mechanism, the cavity is not opened even by the high pressure applied to the cavity during injection. It is therefore possible to keep a constant margin to compress. It is also possible to open the gate at the time the compression is completed or after that time so as to inject a supplemental amount of resin, close the gate after an appropriate supplemental amount of resin has been injected and stop the injection. It is therefore possible to supply a supplemental amount of resin corresponding to the amount of resin which escapes during the compression, and obtain molded products with good appearance and dimensional precision and no sinking. In addition, since the passage can be changed by the variable resin passage mechanism so that the effective diameter thereof is reduced when the supplemental amount of resin is supplied, the range of transmission of pressure can be adjusted by appropriately selecting the size of the passage area. Further, since injection pressure is applied only to a portion near the region where a backward flow of resin occurs, the supplemental amount of resin can be supplied without residual strain.

Further, since the movable mold is precisely held by the mechanical fixing mechanism for preventing the mold from moving backwardly when it reaches a predetermined position, a margin to compress is not changed, and molded products can be stably obtained. A predetermined amount of molten resin can be injected and charged into the cavity of the molds mounted on the movable platen fixed at the starting point of compression where the molds are open a predetermined amount, or the molds can be moved while being maintained parallel during the charge of resin so that the molten resin is uniformly compressed in the molds and uniformly flows therethrough. It is therefore possible to supply a supplemental amount of the resin corresponding to the amount of compressed resin which escapes, and to obtain molded products with no sinking and good appearance, dimensional precision and texture.

BRIEF DESCRIPTION OF THE DRAWINGS

FIG. 1(a) is a drawing of the configuration of a first embodiment of the present invention;

FIG. 1(b) is an enlarged view of a part of FIG. 1;

DETAILED DESCRIPTION OF PREFERRED EMBODIMENTS

Figure 2:
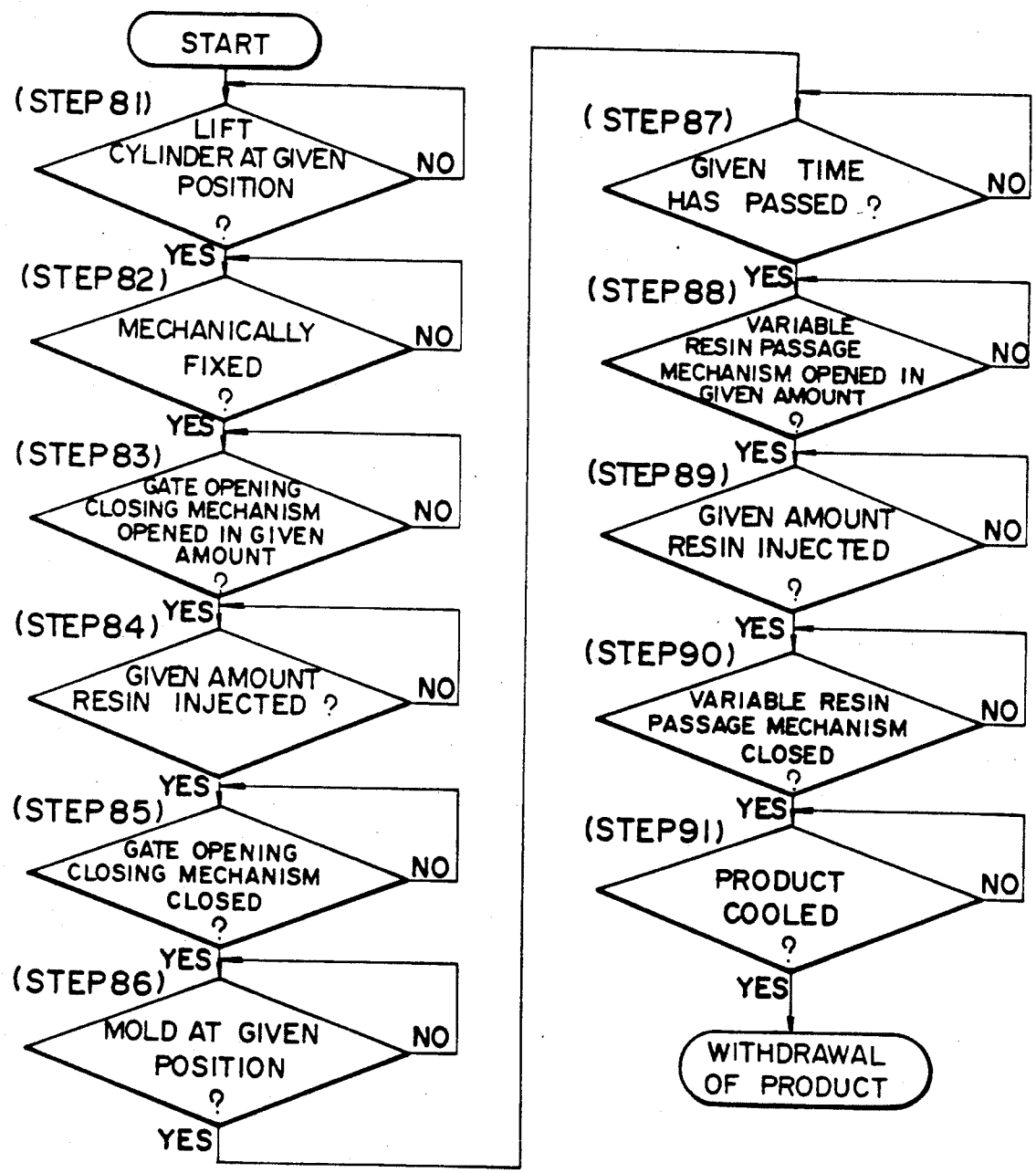
FIG. 2 is a flowchart of the first embodiment of the present invention.

Embodiments of an injection and compression molding apparatus and a molding method therefor in accordance with the present invention are described in detail below with reference to the drawings. FIG. 1 is a drawing of the configuration of a first embodiment of the present invention, and FIG. 2 is a flowchart of the same embodiment. In FIG. 1, to a frame 2 of a compression molding machine 1 is fixed a lift cylinder 4 for slidably moving a movable die plate 3 by using the hydraulic pressure supplied from a pump (not shown), a movable mold 5 and a stationary mold 7 being mounted on the movable die plate 3 and a table 6, respectively. An injection port 8 is formed in the stationary mold 7 so that the molten resin 9 from an injection portion 40 in the table 6 is injected through the injection port 8 and charged into a cavity 10 formed by the two molds 5, 7. The movable die plate 3 is mechanically fixed by a mechanical fixing mechanism 20 at a position where the two molds 5, 7 are placed at a predetermined distance (A). The mechanical fixing mechanism 20 comprises two compression cylinders 21 for compressing the resin injected and charged into the cavity 10, two links 22 for respectively supporting the compression cylinders 21, two lock cylinders 23 for respectively tilting the links 22, two rods 28, and two height adjusters 27 which cause the links 22 and the lock cylinders 23 to be respectively fixed to cylinder frames 24 through pins 25, 26 and which respectively move (in the direction X) the cylinder frames 24 in correspondence with the thickness of the molds and the predetermined distance (A) between the molds 5, 7. The injection portion 40 comprises an injection mechanism 50, a gate opening/closing mechanism 60, and a variable resin passage mechanism 70. The injection mechanism 50 comprising a screw 51, a screw rotating motor 52 and an injection cylinder 53. Pistons in chambers in the injection cylinder 53 cause slidable movement between screw 51 and injection cylinder 53 so that the resin is ram injected by the forward movement of screw 51. A gate 54 between the stationary mold 7 and the injection mechanism 50 is provided with the gate opening/closing mechanism 60 and the variable resin passage mechanism 70. The valve 63 of the gate opening/closing mechanism 60 is opened and closed by actuating a servo motor 62 on the basis of the command from a controller 61. The relative position between the passage 71 formed in the valve 63 of the variable resin passage mechanism 70 and the gate 54 can be changed so that the effective area of the passage is determined.

Figure 3:
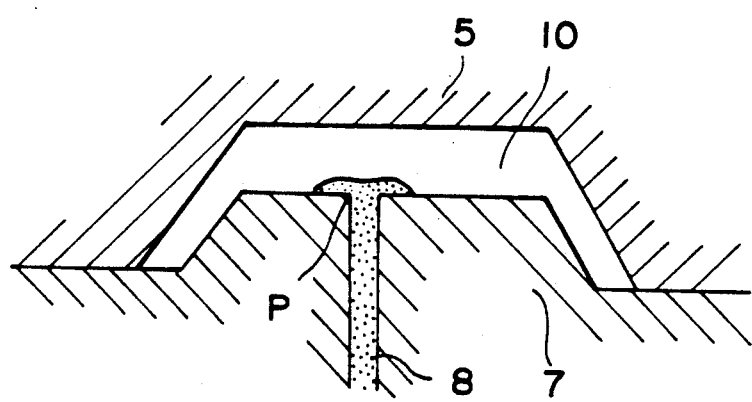
FIG. 3 is an explanatory view of the resin in a near an injection port in the present invention.

The function of the aforementioned configuration is explained below with reference to FIGS. 1, 2 and 3. In FIGS. 1 and 2, the movable die plate 3 is moved to the position where the distance (A) between the two molds 5, 7 is a predetermined value by sending pressure to the lift cylinder 4 from a pump (not shown) during injection and compression molding (Step 81). In this step, although the detection of a position is not shown in FIG. 2, when the lift cylinder 4 and the movable die plate 3 are respectively moved to predetermined positions, hydraulic pressure is sent to the lock cylinders 23 of the mechanical fixing mechanism 20, which is adjusted by the height adjusters 27 so that the predetermined distance (A) is obtained, whereby the mechanical fixing mechanism 20 is tilted from the position shown by broken lines (a) to the position shown by solid lines (b). As a result, the movable die plate 3 is mechanically fixed (Step 82). The mechanical fixing is detected by positional sensors (not shown) provided on the pins 25, 26 so that the valve 63 of the gate opening/closing mechanism 60 is opened by actuating the servo motor 62 on the basis of the command output from the controller 61 (Step 83). The hydraulic pressure and the amount of oil in injection cylinder 53 are then controlled so that a predetermined injection speed and injection pressure can be obtained, and the screw 51 is slid forwardly so that the desired amount of resin is injected and charged into the cavity 10 (Step 84). During this injection operation, the movable mold 5 has the tendency to open owing to the injection pressure in the cavity 10. However, since the movable mold 5 is mechanically fixed through the movable die plate 3, the set distance (A) between the two molds 5, 7 can be maintained. A decision is made by detecting the axial position of screw 51 as to whether or not a predetermined amount of resin has been injected, in the same way as in conventional apparatuses. When a predetermined amount of resin is injected, the valve 63 of the gate opening/closing mechanism 60 is closed by actuating the servo motor 62 on the basis of the command from the controller 61 (Step 85). Hydraulic pressure is then sent to the compression cylinder 21 for compressing the resin in the cavity 10, and the movable mold 5 is moved toward the stationary mold 7 as a result of the pressure on the movable die plate 3 so that compression molding is effected (Step 86). When a predetermined time has passed (Step 87) after the movable mold 5 has reached a predetermined position, the servo motor 62 is actuated on the basis of the command from the controller 61 so that the passage 71 of the variable resin passage mechanism 70 is opened a predetermined amount in correspondence with the area thereof (Step 88). The effective opening of the passage during Step 88 is smaller than that for the injected resin in Step 84 and is preferably 3 to 60%, more preferably 5 to 30% of the effective passage opening during Step 84. When the passage of the variable resin passage mechanism 70 is opened, a predetermined supplemental amount of resin is injected for the purpose of filling the recess (P) formed in a portion extremely near the injection port 8 connected to the gate in which a backward flow of the resin occurs, as shown in FIG. 3, so that the range of transmission of pressure does not extend to other charged portions (Step 89). When a predetermined supplemental amount of resin has been charged, the variable resin passage mechanism 70 is again closed (Step 90), and the resin is maintained under compression until it is cooled. After cooling, hydraulic pressure is sent to the compression cylinders 21 and the lock cylinders 23 so as to release the mechanical fixing mechanism 20, and the lift cylinder 4 is then moved so that the molds are separated, whereby a molded product can be withdrawn from the molds.

In the above-described embodiment, although the valve 63 of the gate opening/closing mechanism 60 is actuated closed after a predetermined initial amount of resin has been charged in Step 84, the gate opening/closing mechanism 60 can be actuated closed during the time of the resin charge motion of the pistons in injection cylinder 53. Similarly, although the resin is molded under compression after the valve 63 of the gate opening/closing mechanism 60 has been actuated closed in Steps 85, 86, the valve 63 of the gate opening/closing mechanism 60 can be actuated closed after the compression molding of the resin has been initiated. In addition, instead of the passage 71 of the variable resin passage mechanism 70 being opened after a predetermined time has passed in Step 87, the passage 71 can be opened by detecting the pressure in the cavity 10. The mechanical fixing mechanism is not limited to the aforementioned embodiment, and links moving in parallel to each other may be employed.

A second embodiment is described below with reference to FIGS. 4 to 7.

Figure 4:
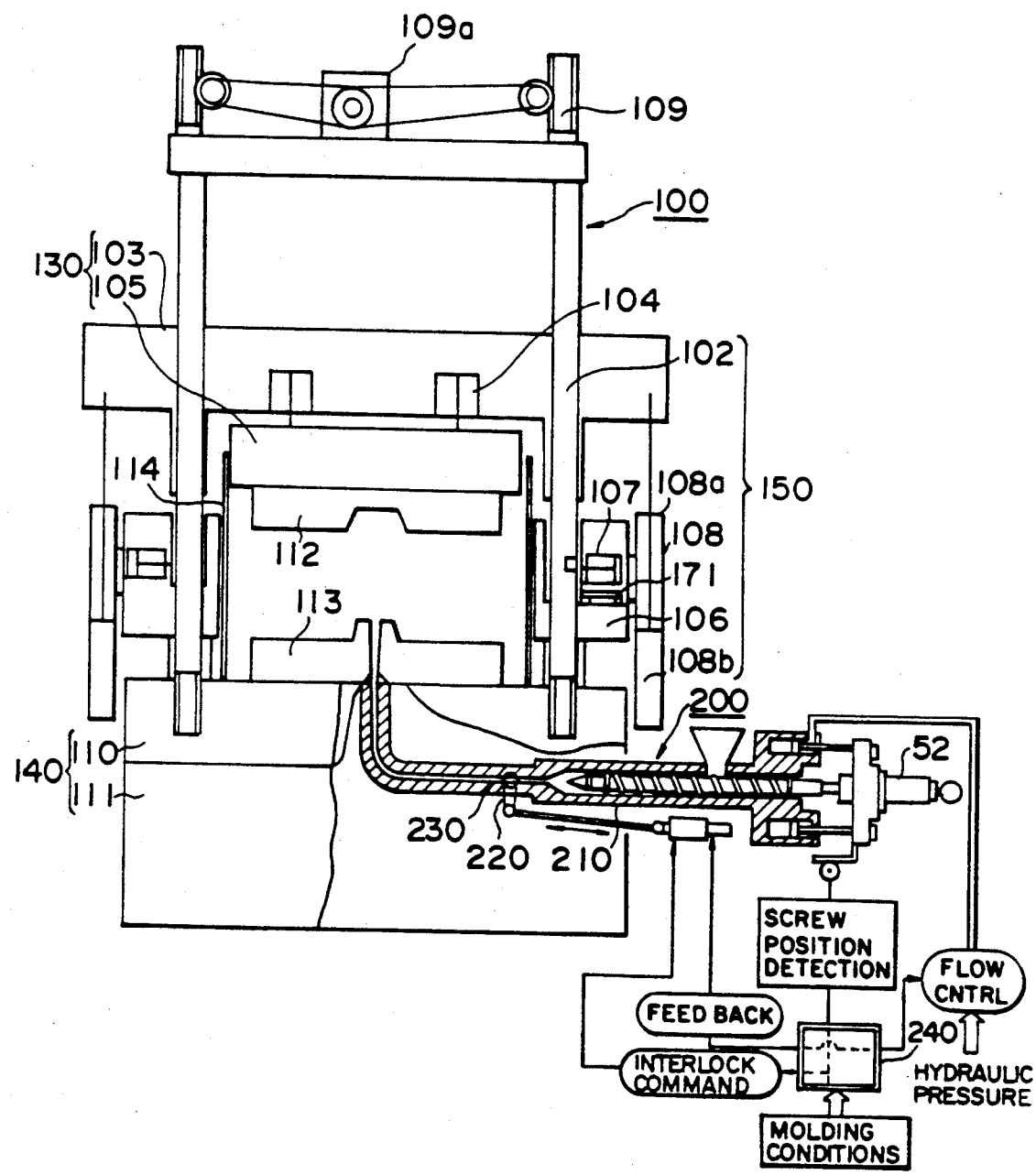
FIG. 4 is a front view of a press molding apparatus in a second embodiment of the present invention.
Figure 6:
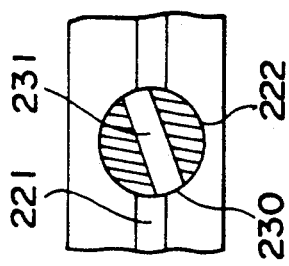
FIG. 6 is a partially enlarged view of an injection unit.
Figure 5:
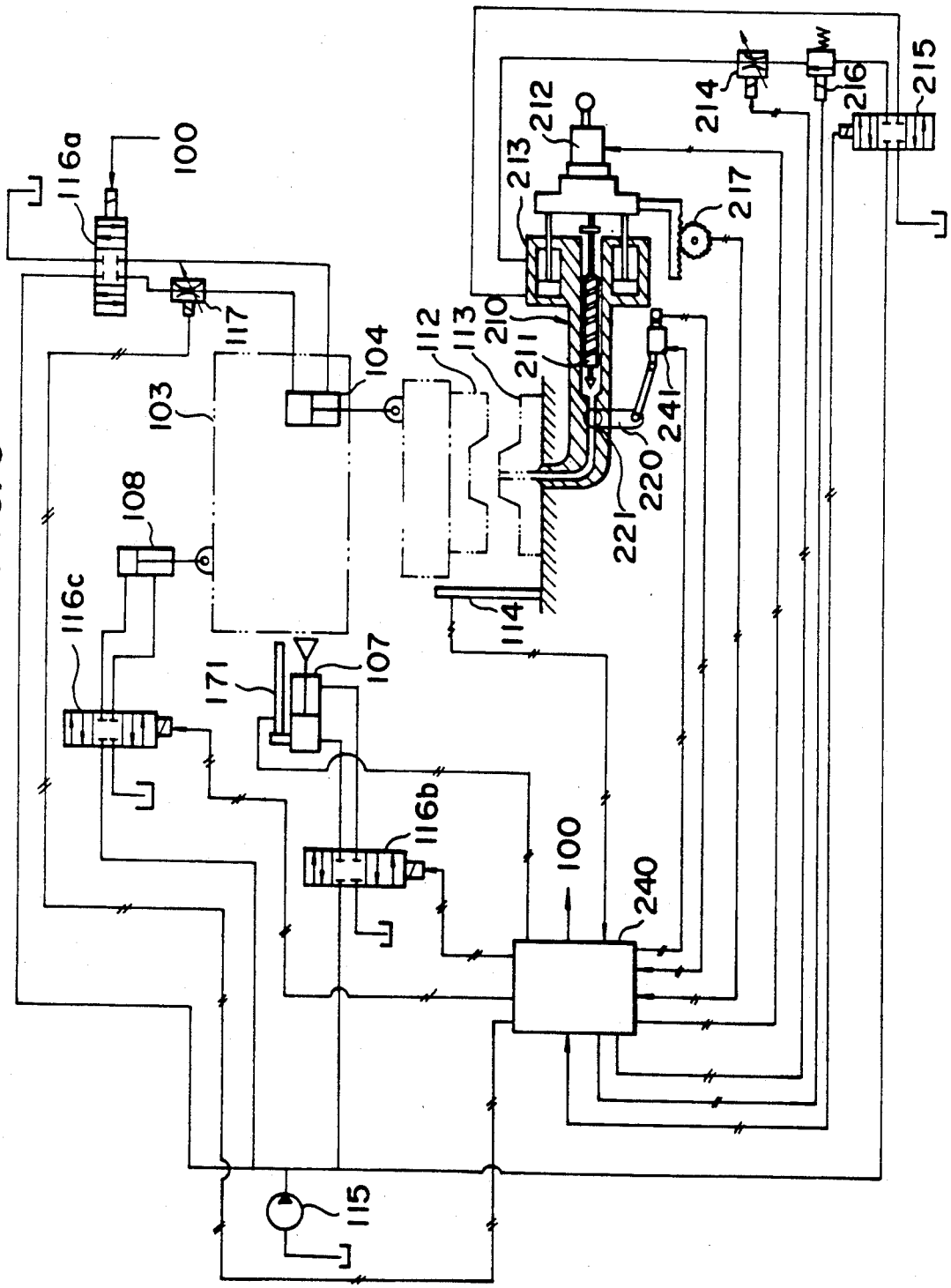
FIG. 5 is a drawing of the circuit of the same molding apparatus.
Figure 7:
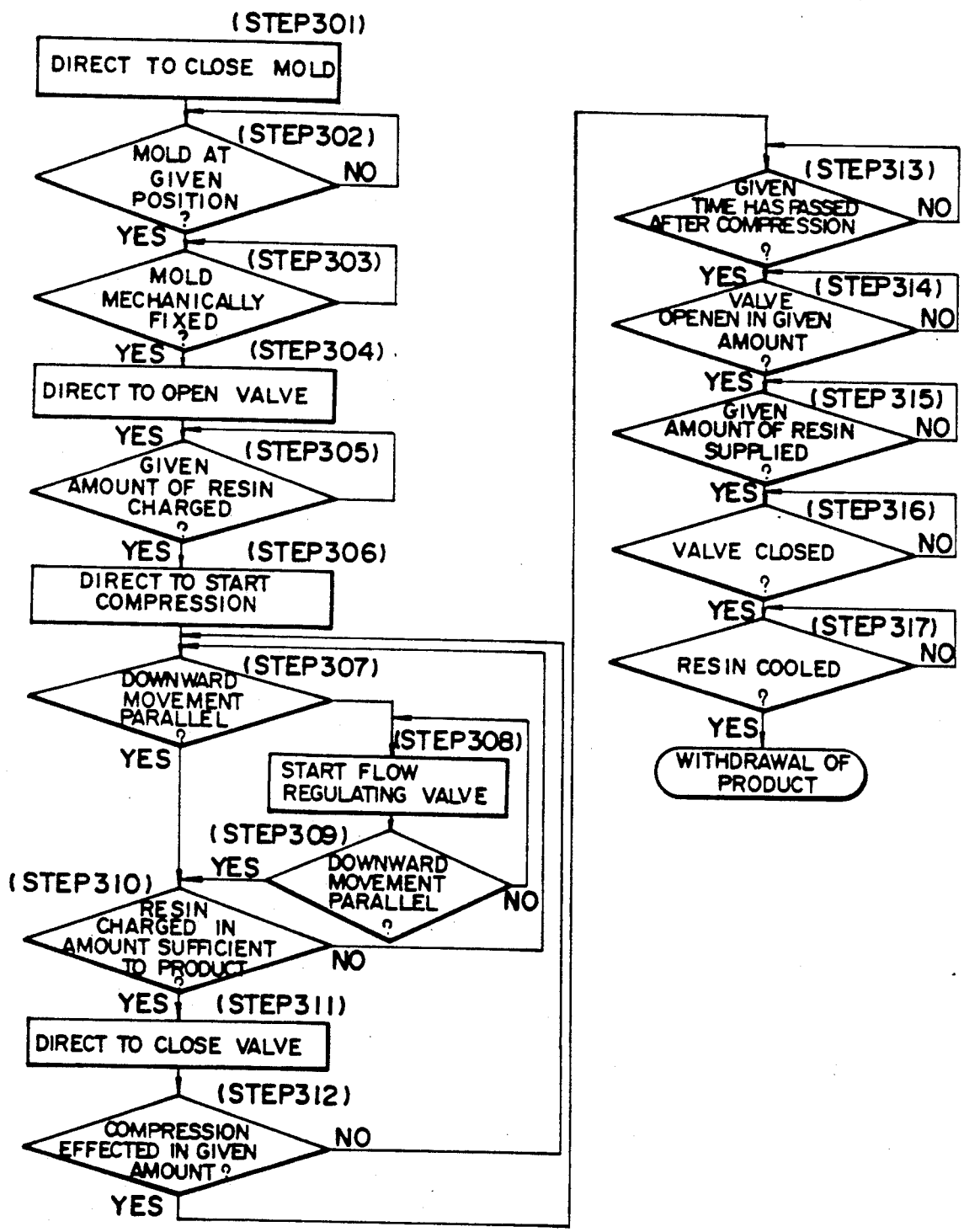
FIG. 7 is a flowchart of the apparatus in the second embodiment.

FIG. 4 is a drawing of the configuration of a second embodiment of the present invention, FIG. 5 is a drawing of the circuit of the same embodiment, FIG. 6 is an enlarged view of a gate opening/closing mechanism, and FIG. 7 is a flowchart. In FIG. 4, reference numeral 100 denotes a press molding apparatus for thermoplastic resin. The press molding apparatus 100 comprises four lift guide rods 102, a lift frame 103 which is supported by the lift guide rods 102 so as to longitudinally move, an upper die plate 105 which is supported by four compression cylinders 104 contained in the lift frame 103, four catcher cases 106 respectivey fixed to the four lift guide rods 102, four lock cylinders 107 respectively contained in the catcher cases 106, four lift cylinders 108 for the lift frame 103, a belt driven by a motor 109a for separately adjusting the four lift guide rods 102 in the longitudinal direction, a die plate 110 which engages by screws with height adjusters 109 operated through worm gears so as to support the adjusters 109, and a frame 111 on which the die plate 110 is loaded and fixed. A movable platen 130 comprises the lift frame 103 and the upper die plate 105, a fixed platen 140 comprises the die plate 110 and the frame 111, and a mechanical fixing apparatus 150 comprises the catcher cases 106, the lock cylinders 107, the lift cylinders 108 and the lift guide rods 102. Each of the lock cylinders 107 is provided with a lock detector such as a position sensor 171 or the like for detecting whether or not the movable platen 130 is mechanically locked by the mechanical fixing apparatus 150. An upper mold 112 is fixed to the upper die plate 105, and a lower mold 113 and mold position detectors such as position sensors 114 are fixed to the die plate 110.

An injection unit 200 comprises an injection mechanism 210, a gate opening/closing mechanism 220, a variable resin passage mechanism 230, and a control section 240, the injection unit 200 being disposed under the die plate 110.

FIG. 5 is a drawing of the circuit in which the compression cylinders 104, the lock cylinders 107 and the lift cylinders 108 are operated by the hydraulic pressure supplied from a pump 115 through solenoid valves 116a, 116b and 116c, respectively. The lock cylinders 107 are operated by the hydraulic pressure supplied from the pump 115 so as to detect the locking of the lift frame 103 by the lock detectors such as the position sensors 171. A flow regulating valve 117 is provided in the circuit of the compression cylinders 104 for the purpose of regulating the flow rate in correspondence with the speed detected by the position sensors 114 in response to the signal output from a control section 240 so that the upper mold 112 is longitudinally moved while being maintained parallel with the fixed mold 113. This movement controller for maintaining the parallel relationship during movement comprises the position sensors 114, the flow regulating valve 117, the control section 240 and the compression cylinders 104. When the circuits are operated by using one pump, the circuits can be separately operated with the flow rate being adjusted by the pump, or only one solenoid valve and flow regulating valve can be used to control the four compression cylinder circuits.

The injection mechanism 210 comprises a screw 211, a screw rotating motor 212, injection cylinders 213, a flow regulating valve 214, a solenoid valve 215 and a pressure regulating valve 216. The resin is kneaded and measured by using the screw 211 rotated by the screw rotating motor 212. The injection speed of the molten resin is controlled by controlling the sliding of the pistons in injection cylinder 213 by using the flow rate regulated by the flow regulating valve 214. The injection output of the molten resin is controlled by the solenoid valve 216. The amount of resin injected is measured by the position sensor 217 detecting the position of the pistons in injection cylinder 213. A gate opening/closing mechanism 220 and the variable resin passage mechanism 230 shown in FIG. 6 are provided in a gate formed between the lower mold 113 and the injection mechanism 210. The valve 222 of the gate opening/closing mechanism 220 is opened and closed by operating a servo motor 241 on the basis of the command output from the control section 240. The effective area of the passage through valve 222 is determined by changing the relative position between the gate 22 and the passage 231 formed in the valve 222 of the variable resin passage mechanism 230.

The operation of the aforementioned structure is described below.

A description is first made of setting of a compression stroke of the press molding device with reference to FIG. 4. The lift frame 103 is placed at the lowest point (the lift cylinder 108 is placed at shortest stroke end), and the compression cylinders 104 are placed at the shortest stroke end so that the upper mold 112 and the lower mold 113 are put into close proximity with each other by the height adjusters 109. At the same time, as the height adjusters 109 are capable of separately adjusting the heights of the four lift guide rods 102, the two molds can be brought into contact with each other. In the contact state, the lift frame 103 is mechanically locked to the catcher cases 106 by the lock cylinders 107 of the mechanical fixing apparatus 150. Hydraulic pressure is then sent to the port 108a of each of the lift cylinders 108 so as to prevent any backlash. The lift frame 103 is then moved upwardly over a required compression stroke by the height adjusters 109 from the lowest position which is the starting point. During this operation, since the heights of the lift guide rods 102 can be separately adjusted by the height adjusters 109, the initial parallelism of the upper and lower molds is maintained. The position, which is set in the lock detectors such as the position sensors so that each of the lock cylinders 107 is mechanically fixed, is input to the control section 240, and the upper mold 112 is stopped at this position, and the melted resin is then injected and charged.

When the molding operation is started, the lock cylinders 107 are released in the initial state as shown in FIG. 4, and hydraulic pressure is sent to the port 108b of each of the lift cylinders 108 so as to lift the lift frame 103 in a state wherein the compression cylinders 104 are at the shortest stroke end. When the molds are closed during compression molding in the next step in the flowchart shown in FIG. 7, the lift cylinders 108 are placed at the shortest stroke end, and detection is made by the mold position detectors as to whether or not the upper mold is lowered to a predetermined position (Step 301). If the upper mold is not lowered to the predetermined position, the operation in Step 301 is repeated, and if the upper mold is lowered to the predetermined position, a signal is sent to the solenoid valve 116b from the control section 240 so as to apply hydraulic pressure to the lock cylinders 107 for mechanically locking the lift frame 103 (Step 303). A signal is sent to the control section 240 from each of the lock detectors mechanically locked. When the control section 240 receives these signals, it actuates the servo motor 241 so as to open the valve 222 of the gate opening/closing mechanism 220 (Step 304). The hydraulic pressure and the amount of oil in the injection cylinder 213 is then controlled by the control section 240 so that the melted resin measured in the injection mechanism 210 is injected at an injection speed and an injection pressure which are previously set, and a predetermined amount of the resin is injected and charged into the cavity by the screw 211 (Step 305). During this operation, although the upper mold 112 tends to open owing to the reaction force caused by the pressure of the resin in the cavity, a predetermined set distance between the two molds can be kept because the upper mold 112 is mechanically fixed through the lift frame 103.

The axial position of the screw 211 can be detected by the position sensor 217 for making a decision as to whether or not a predetermined amount of resin has been injected, in the same way as in conventional apparatuses. If a predetermined amount of resin has been injected, a signal is sent to the control section 240 from the screw position detector, and when the control section 240 receives this signal, it sends to the solenoid valve 116a a signal of command to start compression so that hydraulic pressure is sent to the compression cylinders 104 from the pump 115, whereby the resin in the molds is compressed (Step 306).

In this step, the position of the upper mold is detected by the mold position detectors, which are respectively provided at the four corners of the die plate 110, and the detection signal is sent to the control section 240 in which the speed is calculated (Step 304). On the basis of this signal, the amount of oil sent to the compression cylinder 104 is controlled by the flow regulating valve 117 on the basis of the command from the control section 240 so that the upper mold is lowered while being maintained parallel with the lower mold (Steps 308, 309). During compression molding, when the screw position detector detects that a predetermined amount of resin required for a product has been charged into the cavity of the molds (Step 310), the control section 240 receives the detection signal and then operates the servo motor 241 so as to close the valve 222 of the gate opening/closing mechanism 220 (Step 311). Even if the valve 222 is closed so that the supply of the resin is stopped, the compression cylinders 104 are controlled so that the upper mold is moved downwardly in parallel with the lower mold in the same way as that described above.

When the upper mold has been moved to a predetermined position, for example, at which the two mold are in contact with each other, and when compression molding has been performed, and then a predetermined time has passed (Steps 312, 313), the servo motor 241 is actuated on the basis of the command from the control section 240 so that the passage 231 of the variable resin passage mechanism 230 is opened a given amount corresponding to the area which is previously set (Step 314). At this time (Step 310), the degree of opening of the passage is smaller than that during injection in Step 305, and is preferably 3 to 60%, more preferably 5 to 30% of the effective opening during Step 305. When the passage 231 of the variable resin passage mechanism 230 is opened, a predetermined supplemental amount of resin is injected for the purpose of filling the recess formed in a portion near the injection port connected to the gate where a backward flow of the resin occurred so that the range of transmission of pressure does not extend to other regions charged with the resin (Step 315). When a predetermined supplemental amount of resin is charged, the variable resin passage mechanism 230 is again closed (Step 316), and the resin is maintained in the molds until it is cooled. After cooling, hydraulic pressure is sent to the compression cylinders 104 and the lock cylinders 107 so as to release the mechanical fixing mechanisms 150, whereby the molds can be opened after the lift cylinder has been moved and the molded product can be withdrawn from the molds.

In the aforementioned embodiment, although backlash is removed by locking the lift frame 103 by the lock cylinders 107 and applying hydraulic pressure to the ports 108a, backlash may be removed before or after locking. In addition, although the position sensors detect the movement of the movable mold for the purpose of maintaining the movable mold parallel with the fixed mold during movement of the movable mold, the movement may be detected by using the upper die plate, the rod of the compression cylinder or the like.

Further, although the upper and lower molds can be put into contact with each other during setting of the compression stroke, in the case of known dimensions the height adjusters 109 can be separately adjusted so that the initial parallelism is maintained. The resin compression molding can be performed by moving the movable mold downwardly while charging the resin, or compression molding can be effected after the resin has been charged and the valve has been closed. In addition, a margin to compress between the two molds can be controlled by the height adjusters, or the margin can be controlled by using hydraulic cylinders such as the lift cylinders or the like.

As described above, each of the above-described embodiments enables the supply of a supplemental amount of resin corresponding to the amount of the compressed resin which escaped. The embodiments also have the effects that, since the area of the passage can be set to a small value and changed by the variable resin passage mechanism, the range of transmission of pressure can be adjusted by selecting the area of the passage and the injection pressure can be applied only to a portion of the resin in the mold cavity near the region where a backward flow of the resin occurs. It is therefore possible to provide an injection and compression molding apparatus and a molding method therefor which is capable of stably producing molding products having good appearance, dimensional precision and quality with good productivity.

An injection and compression molding apparatus and a molding method therefor in accordance with the present invention can be applied to molding apparatuses in which resin is molded by injection and compression in various kinds of industry of manufacturing plastic molded products.

What is claimed is:

1. In an injection and compression molding method wherein a first mold is moved towards a second mold, the movement of said first mold toward said second mold is temporarily stopped at about the starting position of compression so that an initial amount of molten resin can be supplied by injection through a gate passageway into a cavity formed by said first and second molds, said gate passageway into said cavity is closed upon said initial amount of molten resin being supplied through said gate passageway into said cavity, the first mold is moved from its stopped position towards said second mold to initiate the compression molding of the resin in said cavity, and the thus compressed resin is cooled to form a molded article, the improvement comprising opening said gate passageway and injecting a supplemental amount of molten resin through said gate passageway into said cavity after the initial amount of molten resin has been compressed, to thereby provide the desired amount of resin in the molded article.

2. An injection and compression molding method in accordance with claim 1, wherein the effective cross sectional area of the gate passageway is smaller during the injection of said supplemental amount than during the injection of said initial amount.

3. An injection and compression molding method in accordance with claim 1, further comprising establishing a signal when said first mold is at a predetermined position, and wherein said first mold is stopped, at about the starting position of compression, by lift cylinders driven on the basis of said signal.

4. An injection and compression molding method in accordance with claim 1, further comprising generating a signal when the injection of a predetermined amount of molten resin into said cavity is completed, and wherein the step of moving said first mold from its stopped position towards said second mold is started on the basis of said signal.

5. An injection and compression molding method in accordance with claim 1, wherein the effective cross section al area of the gate passageway during the injection of said supplemental amount is in the range of 3 to 60 percent of the effective cross sectional area of the gate passageway during the injection of said initial amount.

6. An injection and compression molding method in accordance with claim 1, wherein the effective cross sectional area of the gate passageway during the injection of said supplemental amount is in the range of 5 to 30 percent of the effective cross sectional area of the gate passageway during the injection of said initial amount.

7. An injection and compression molding method in accordance with claim 1, wherein the closing of said gate passageway upon said initial amount of molten resin being supplied through said gate passageway into said cavity is performed after the compression molding of the resin contained in said cavity has been initiated and prior to the step of opening said gate passageway for the injection of said supplemental amount of molten resin.

8. An injection and compression molding method in accordance with claim 1, wherein said gate passageway contains a variable gage valve, wherein said gate valve is opened to provide a first effective cross section of the gate passageway for permitting said initial amount of molten resin to be supplied through said gate passageway into said cavity while said first mold is temporarily stopped at about the starting position of compression, wherein said gate valve is closed after said initial amount of molten resin has been supplied to said cavity, wherein after said initial amount of molten resin has been compressed said gate valve is opened to provide a second effective cross section of the gate passageway for permitting said supplemental amount of molten resin to be injected through said gate passageway into said cavity, and wherein said second effective cross section is smaller than said first effective cross section.

9. An injection and compression molding method in accordance with claim 8, wherein said second effective cross section is in the range of 3 to 60 percent of said first effective cross section.

10. An injection and compression molding method in accordance with claim 8, wherein said gate valve is opened to provide said second effective cross section of the gate passageway at a predetermined time after said initial amount of molten resin has been compressed.

11. An injection and compression molding method in accordance with claim 8, wherein said gate valve is opened to provide said second effective cross section of the gate passageway in response to the detection of a predetermined pressure in said cavity.

12. An injection and compression molding apparatus comprising a compression molding apparatus for opening and closing a movable mold and a stationary mold, an injection apparatus for supplying molten resin to at least one cavity formed by said movable and stationary molds, mold position detecting means for detecting a predetermined position of said movable mold wherein said movable and stationary molds are open, mechanical fixing means for mechanically fixing said movable mold at said predetermined position, gate means for permitting molten resin from said injection apparatus to flow through a resin passageway into said at least one cavity when said mold position detecting means detects said predetermined position and said movable mold is mechanically fixed in said predetermined position, injection amount detecting means for detecting that an initial predetermined amount of molten resin has flowed into said at least one cavity, and compression means for moving said movable mold from said predetermined position towards said stationary mold to compress the initial predetermined amount of molten resin contained in said at least one cavity, wherein said gate means comprises a variable position gate valve located in the resin passageway to said at least one cavity and a gate control means for closing said gage valve and for varying the position of said gate valve when it is open to thereby change the effective cross section of the resin passageway when said gate valve is open, wherein said gate control means comprises means for opening said gate valve to provide a first effective cross section of the resin passageway for permitting molten resin from said injection apparatus to flow into said at least one cavity when said mold position detecting means detects said predetermined position and said movable mold is mechanically fixed in said predetermined position, for closing said gate valve when said injection amount detecting means has detected that the initial predetermined amount of molten resin has flowed into said at least one cavity to thereby stop the flow of molten resin into said at least one cavity after said initial predetermined amount of resin has flowed into said at least one cavity, for opening said gate valve to provide a second effective cross section of the resin passageway for permitting a supplemental amount of molten resin from said injection apparatus to flow into said at least one cavity after said compression means has moved said movable mold from said predetermined position into contact with said stationary mold to compress the initial predetermined amount of molten resin, and for closing said gate valve when said supplemental amount of molten resin has flowed into said at least one cavity, said second effective cross section being smaller than said first effective cross section.

13. An injection and compression molding apparatus in accordance with claim 12, wherein said second effective cross section is in the range of 3 to 60 percent of said first effective cross section.

14. An injection and compression molding apparatus in accordance with claim 12, wherein said gate control means opens said gate valve to provide said second effective cross section of the resin passageway at a predetermined time after said compression means has moved said movable mold from said predetermined position into contact with said stationary mold to compress the initial predetermined amount of molten resin.

15. An injection and compression molding apparatus in accordance with claim 12, wherein said gate control means opens said gate valve to provide said second effective cross section of the resin passageway in response to the detection of a predetermined pressure in said at least one cavity.

* * * * *

UNITED STATES PATENT AND TRADEMARK OFFICE
CERTIFICATE OF CORRECTION

PATENT NO. : 5,221,509
DATED : June 22, 1993
INVENTOR(S) : Satoshi FUJIMOTO et al It is certified that error appears in the above-identified patent and that said Letters Patent is hereby corrected as shown below:

Column 10, line 26, change "mold toward" to --mold towards--.

Column 10, line 64, change "section al" to --sectional--.

Column 11, line 19, change "variable gage" to --variable gate--.

Column 12, line 12, change "gage" to --gate--.

Signed and Sealed this

Fifth Day of April, 1994

Attest:

BRUCE LEHMAN

Attesting Officer

Commissioner of Patents and Trademarks